United States Patent
Ertel et al.

(10) Patent No.: US 10,019,799 B2
(45) Date of Patent: Jul. 10, 2018

(54) METHOD FOR DETERMINING COLLATERAL INFORMATION DESCRIBINGTHE BLOOD FLOW IN COLLATERALS, MEDICAL IMAGING DEVICE, COMPUTER PROGRAM AND ELECTRONICALLY READABLE DATA MEDIUM

(71) Applicants: Dirk Ertel, Forchheim (DE); Yiannis Kyriakou, Spardorf (DE)

(72) Inventors: Dirk Ertel, Forchheim (DE); Yiannis Kyriakou, Spardorf (DE)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 15/477,208

(22) Filed: Apr. 3, 2017

(65) Prior Publication Data

US 2017/0287132 A1    Oct. 5, 2017

(30) Foreign Application Priority Data

Apr. 4, 2016    (DE) .......................... 10 2016 205 507

(51) Int. Cl.
  *G06K 9/00*    (2006.01)
  *G06T 7/00*    (2017.01)
  *G06T 7/11*    (2017.01)

(52) U.S. Cl.
  CPC .............. *G06T 7/0012* (2013.01); *G06T 7/11* (2017.01); *G06T 2207/30104* (2013.01)

(58) Field of Classification Search
  CPC ......... G06T 2207/30104; G06T 7/0012; G06T 7/11

(58) Field of Classification Search
  USPC ........................................................ 382/128
  See application file for complete search history.

(56) References Cited

U.S. PATENT DOCUMENTS

| | | | |
|---|---|---|---|
| 2016/0048959 A1* | 2/2016 | Kowarschik | G06T 7/0012 600/425 |
| 2016/0089095 A1* | 3/2016 | Baumgart | A61B 6/504 382/130 |

FOREIGN PATENT DOCUMENTS

WO    WO2014036638 A1    3/2014

OTHER PUBLICATIONS

German Office Action for related German Application No. 10 2016 205 507.0 dated Jan. 3, 2017, with English Translation.

* cited by examiner

*Primary Examiner* — Manuchehr Rahmjoo
(74) *Attorney, Agent, or Firm* — Lempia Summerfield Katz LLC

(57) ABSTRACT

Determining collateral information describing blood flow in collaterals of a blood vessel system in a target region of a patient from a four-dimensional vascular data set describing image values of temporal flow of a contrast medium and/or marked blood constituents as recorded by a medical imaging device is provided. A method includes segmenting the blood vessel system in the vascular data set and determining collaterals among the segmented blood vessels by a collateral classifier. For all collaterals determined, a diameter of the collateral is determined taking into account the segmentation, a filling parameter describing the filling of the collaterals, and a time parameter describing the time response relative to a reference point in the blood vessel system from a temporal course of the image values in a portion of the collaterals under consideration. The method includes determining the collateral information from the diameter, the filling parameter, and the time parameter.

21 Claims, 2 Drawing Sheets

METHOD FOR DETERMINING COLLATERAL INFORMATION DESCRIBING THE BLOOD FLOW IN COLLATERALS, MEDICAL IMAGING DEVICE, COMPUTER PROGRAM AND ELECTRONICALLY READABLE DATA MEDIUM

CROSS-REFERENCE TO RELATED APPLICATIONS

The present patent document claims the benefit of DE 102016205507.0, filed on Apr. 4, 2016, which is hereby incorporated by reference in its entirety.

BACKGROUND

The present embodiments relate to a method for determining collateral information describing blood flow in collaterals of a blood vessel system of a target region of a patient. The present embodiments also relate to a medical imaging device, a computer program and an electronically readable data medium for determining the collateral information.

The cause of many medical conditions is a critical disturbance of the blood supply. One example is a stroke, where the blood supply to the brain is critically disturbed. In cases of stroke, medical image data is typically recorded as a vascular data set indicative of the blood vessel system enabling an assessment of possible interventions and to issue prognoses for convalescence. Every patient's blood vessel system is individual (e.g., a specific diameter) and may include unique interconnections between individual blood vessels (e.g., anastomoses). Blood vessels of this size are generally referred to as collaterals. Collaterals generally ensure that the blood is supplied to a region of tissue in the event of a displacement or injury to individual blood vessels. If the target region of the patient is the brain (e.g., the condition of the leptomeningeal anastomoses), collaterals have been found to be one of the decisive factors in predicting the outcome of mechanical recanalization.

Typically, four-dimensional angiography vascular data sets are used for evaluations of this kind. In addition to three spatial dimensions, four-dimensional vascular data sets also describe (e.g., in the image values) the temporal flow of a contrast medium and/or marked blood constituents through the target region. A contrast medium is usually used with X-ray imaging. In addition using a contrast medium with magnetic resonance imaging, the use of spin-labeling and comparable techniques is known. Hence, 4D-angiography vascular data sets provide both anatomical and physiological information relating to the blood flow. When vascular data sets are used for clinical purposes (e.g., in the context of stroke treatment), the status of collaterals is extremely important. For example, known methods for the evaluating the status of the collaterals are visual evaluation of two-dimensional images from digital subtraction angiography (DSA) and computed tomography angiography (CTA) with reference to the filling of the respective blood vessels. In these methods, a doctor with the appropriate training performs the analysis manually. As such, it is a disadvantage that evaluation and classification of the severity of the occlusion or flow disturbance for the purposes of an assessment of the therapeutic measures for stroke treatment is subjective.

SUMMARY AND DESCRIPTION

The scope of the present invention is defined solely by the appended claims and is not affected to any degree by the statements within this summary.

One or more of the present embodiments may obviate one or more of the drawbacks or limitations in the related art. For example, determining objective information relating to the collateral status is provided.

The present embodiments provide a method for determining collateral information describing the blood flow in collaterals of a blood vessel system in a target region of a patient using a four-dimensional vascular data set recorded by at least one medical imaging device. The four-dimensional vascular data set describes, using image values, the temporal flow of a contrast medium and/or marked blood constituents through the target region. The method includes segmenting the blood vessel system in the vascular data set and determining collaterals among the segmented blood vessels by of a collateral classifier. For all collaterals determined, the method includes determining a diameter of the collateral taking into account the segmentation, a filling parameter describing the filling of the collaterals, and a time parameter describing the time response relative to a reference point in the blood vessel system from a temporal course of the image values in a monitored portion of the collaterals. The method also includes determining the collateral information as, or as a function of, the filling parameter and the time parameter.

The present embodiments are based on knowledge of several basic facts. Evaluation of the blood flow is provided through the collaterals, and a basic measure for the evaluation of collaterals is determined by two main factors: the intensity of the filling of the collaterals (e.g., described by the filling parameter); and the temporal course of filling of the collaterals (e.g., described the time parameter). The filling parameter and the time parameter may be considered to be sufficient for describing the status of the collateral supply (e.g., for a better assessment of the outcome of the therapy or for better planning of the therapy). However, with respect to the time parameter, it is useful to use an optimally suitable four-dimensional vascular data set instead of using the two-dimensional or three-dimensional vascular data sets employed to date because the four-dimensional vascular data set enables information for the flow through the collaterals (as long as there is a flow) to be derived automatically and reliably.

The collateral information obtained may be evaluated in a subsequent act using clinical thresholds derived from studies, and/or thresholds may optionally be automatically derived from computer aided diagnosis (CAD) when a suitable basic set of data has been acquired.

One or more of the present embodiments provide for automatic determination of the status of collateral information describing collaterals with reference to a multi-parameter evaluation of four-dimensional angiography images. Effects, which to date could only be obtained manually, may now be calculated and evaluated automatically. For example, collateral information may be used to evaluate whether a patient has sufficient and hemodynamically intact collaterals to exert a positive influence on stroke treatment. This evaluation of collateral information permits quicker diagnosis and provides an objective evaluation with respect to preparation for therapy and the outcome of the therapy for stroke patients.

The target region does not have to be a patient's brain, and one or more of the embodiments are applicable to other regions of a patient. For example, in the case of tumor embolization (e.g., of the liver), it is possible to check the collateral status in order to determine whether the embolization was successful because it is desirable to stop the blood flow to the tumor. Other fields of application are contemplated where the collateral information is determined automatically (e.g., by a control device of the medical imaging device) and may be used beneficially for any subsequent evaluations and/or diagnostics.

In one or more embodiments, the vascular data set used is a four-dimensional subtraction angiography (DSA) image data set and/or a magnetic data set. Even if aspects of the method disclosed are frequently presented in the following without restricting the general validity with reference to four-dimensional X-ray angiography (e.g., 4D-DSA), the method disclose is applicable to any 4D-enabled imaging modality. Therefore, it may be possible to eliminate drawbacks of other imaging modalities (e.g., the limited resolving power of magnetic resonance imaging) with an appropriate fusion of vascular data from different imaging modalities. For example, when magnetic resonance imaging is used to obtain vascular data, a combination with digital X-ray 2D/2D-vascular data may compensate for resolution deficits and may obtain a suitable four-dimensional vascular data set.

Four-dimensional digital subtraction angiography (4D-DSA) typically measures an administered contrast medium (e.g., either intravenously or selectively intra-arterially in several injections) before recording image data from which the vascular data is based. The basic principle of digital subtraction angiography is to subtract an image data set without contrast medium (e.g., a mask image data set) from image data sets displaying contrast media (e.g., filling image data sets) in order to retain only the contrast medium signal. A time series of subtracting image data sets produces the four-dimensional vascular data set.

Collateral information (e.g., the time parameter) is determined for both arterial and venous collaterals. For example, arteries and veins may also differ or be classified in a known way by their temporal courses. Other differentiation techniques are also contemplated. For example, a 4D-DSA recording may be adapted such that the arterial venous phase may be differentiated in order to determine an artery-artery-delay (AAD) or an artery-venous-delay (AVD) as a time parameter. It is also possible for adaptations to be made during the reconstruction (e.g., providing consistency of two-dimensional projections for determining the three-dimensional image and the like).

During evaluation of the measured physico-technical data in the vascular data set, the blood vessel system is segmented in the vascular data set. Segmentation procedures and suitable algorithms are already known in the art and will not be dealt with in any more detail here. For example, segmentation may be performed easily using digital subtraction angiography.

Vessels of the segmented blood vessel system, as contained in the vascular data set, may be classified (e.g., namely as to whether a collateral is present or whether another vessel is involved). To implement the collateral classifier, a segmented vessel is classified as a collateral if its diameter is smaller than a threshold value or is present in a collateral interval. For example, it may be sufficient to monitor blood vessels with a diameter smaller than a threshold value, because small vessels in the parenchyma (e.g., capillaries) may not be directly resolved or depicted with conventional imaging. In this way, simple threshold value monitoring enables concentration on anastomoses or visible collaterals and not on parenchyma filling. Additionally or alternatively, vessels branching off from main vessels may be identified by an anatomical atlas toward the parenchyma, and the branching vessels may be classified as collaterals. Therefore, analysis may enable specific vessels (e.g., which may be present in all human beings) to be identified by registration with an anatomical atlas. Once these vessels are identified, the collaterals are frequently defined as blood vessel branching off from the identified vessels toward the parenchyma and may be performed during automatic evaluation.

As early as the segmentation stage, center lines of the segmented blood vessels of the blood vessel system may be determined and used to define the portions for which the filling parameter and the time parameter are to be determined. Because the center of the blood vessels is known, the center lines may also be used to define the portions to which the diameter, the filling parameter or time parameter relate, respectively. For example, the collateral information for voxels lying on the center lines and/or voxel groups that include the extension of the collaterals perpendicular to the center line and/or for vascular sections defined along the center line may be determined as the portion. While it may be sufficient to monitor a central voxel lying on the center line as a blood vessel is classified as a collateral (e.g., to use the temporal course of the image values, where the content of the collateral information obtained is also transferred to adjacent voxels of the blood vessel perpendicular to the course of the center line), in some embodiments it may be provided to use a plurality of voxels of the blood vessel (e.g., along the center line and/or perpendicular thereto, where the temporal courses of the image values are averaged or statistically treated in order to be able to filter out measuring errors more efficiently and/or to optimize the signal-to-noise ratio).

The filling parameter may be determined as a function of a maximum in the temporal course, a flow rate determined by integration over the temporal course, an increase in the temporal course in the initial distribution phase, and/or a combination thereof (e.g., it is contemplated that the filling parameter to be determined as these values or a combination of the values). However, due to different diameters/subregions of the target region, the filling parameter may be placed in a suitable relationship facilitating the comparison. The maximum in the temporal course corresponds to the maximum image value over time; if the temporal course of the image values (e.g., with respect to a contrast medium called a contrast medium curve) is integrated, a measure for the flow rate through the corresponding collaterals is obtained. A maximum increase in the temporal course in the initial distribution phase (e.g., when the contrast medium concentration increases) is also a suitable measure for the filling. Additional or different values describing the filling during the passage of the contrast medium or the marked blood constituents are contemplated and definable.

An embodiment provides that the filling parameter is determined based on the diameter and/or at least one first reference value for the same patient and/or at least one reference value external to the patient. The second reference value originates from a reference outside the patient. Reference to the diameter of the vessels ultimately permits better comparability (e.g., when the collateral information is depicted as a collateral map). This is because, with reference to the filling, the diameter of the collateral frequently determines the amount of contrast medium/marked blood constituents that is actually able to flow through. Although in principle the diameter may to some extent be identified from a depiction of the vascular data set, the relationships would be more complicated to establish. Therefore, the diameter (e.g., already determined as collateral information) is, at least implicitly, included in the filling parameter.

Interpretation of the collateral information or a comparison is further simplified in that the interpretation/comparison is related to at least one first reference value and/or at least one second reference value (e.g., second reference value refers to a reference external to the patient). For example, a reference internal to the patient may be created in a healthy sub-region of the target region compared with a sub-region of the target region with a circulatory disturbance (e.g., by a comparison with different brain regions defined in a standardized way). The at least one first reference value may enable integration in the collateral information of a comparison of filling parameters between morbid and healthy sub-regions (e.g., for collaterals with the same diameter). Comparison may be performed with an external reference with which second reference values indicating the expected filling with a healthy collateral/circulation (e.g., in a corresponding anatomic region) are used for collaterals with different diameters.

The first and/or the second reference value to may be determined statistically (e.g., broken down according to the diameter of the collaterals) for the target region and/or a sub-region of the target region. For example, if the at least one first and/or the at least one second reference value is determined statistically in a healthy sub-region of the actual patient and/or for healthy target regions/monitored sub-regions of other patients, determining reference values statistically produces an excellent expectation value for the filling of collaterals in healthy cases, broken down according to diameters.

Several procedures are specifically disclosed for making the reference. For example, determining the filling parameter as a mathematical function of a value determined from the temporal course of the image values is provided (e.g., the filling maximum), and the respective reference (e.g., diameter/reference value) in each case "to standardize" by division by the respective reference. However, performing an evaluation as a function of the reference (e.g., therefore of the diameter) and/or of the at least one reference value may be provided. A characteristic curve, a family of characteristics, and/or a look-up table may be used. The at least one first or second reference values may define intervals in which the filling may be evaluated as "normal", "too low", "too high" and the like (e.g., also in finer steps). Ultimately, a characteristic curve of this kind or a family of characteristics of this kind and/or a look-up table produces a depiction of a value derived from the temporal course of the image values in the monitored portion on the filling parameter of the image values as collateral information, which then explicitly describe an evaluation of the filling. In the case of first reference values, a look-up table (e.g., or a family of characteristics or a characteristic curve) may be generated dynamically for patients (e.g., by statistical treatment for a healthy sub-region of the target region), while depiction options of this kind directed at second reference values external to the patient may be permanently stored in a database of the computing device carrying out the method.

The time parameter may be determined as a function of a bolus arrival time and/or a time until the maximum image value. Different specific definitions of values that may be derived from the temporal course of the image values in the monitored portion of the collateral, forming a basis for the determining the time parameter. For example, a bolus arrival time may be defined as the time at which the image value exceeds a limit value and/or as the time of maximum increase in the initial distribution phase. It is also possible to use the time of the attainment of the maximum image value (e.g., the maximum filling). Other definitions are also contemplated.

The comparable time reference is established by the aforementioned reference point, and may be specifically provided that a predetermined reference point is localized in the vascular data set taking into account the segmentation, where a time is used as the time parameter and/or is used for determining the time parameter relative to a reference time determined at the reference point. A similar determination of the time as a value derived from the temporal course at the reference point (e.g., as a bolus arrival time and/or a time until the maximum image value) may be performed. Initially comparable times from all collaterals exist, where a reference point in a supply vessel of the blood vessel system of the target region is used as the reference point (e.g., when a brain is the target region, and as the reference point in the carotid, determined reproducibly for different patients in order to permit a verifiable comparison between different patients).

However, when comparing times derived from the temporal course of the image values, paths through the blood vessel system may have different lengths even when monitored portions of collaterals appear to be at the same distance from the reference point. As such, it is provided that, based on the segmentation (e.g., based on center lines through the segmented blood vessels) a spatial distance through the blood vessel system between the reference point and the currently monitored portion is determined, where the time parameter is determined based on the distance. Similar to the diameter with respect to the filling parameter, spatial distance through the blood vessel, which is extremely difficult to assess by a visual observation, enables simpler comparability of collateral information, if it is recognized that a bolus arrives much later in a specific collateral than in another collateral, even though the distance through the blood vessel system is the same (e.g., the path length).

To improve the comparison further, it may be provided that the time parameter is determined based on a third reference value for the same patient and/or an external fourth reference value. As discussed above, with respect to the filling parameter, the third and/or the fourth reference value may be determined statistically (e.g., broken down according to distances from the reference point). Look-up tables or families of characteristics and/or characteristic curves may be used to derive the last time parameter derived from the times derived from the temporal course of the image values as provisional values as the evaluation parameter, where comparisons with healthy sub-regions of the target region in the same patient with reference to third reference values and/or with healthy sub-regions/target regions in other patients in the case of fourth reference values external to the patient are provided. The break-down is not performed according to the diameter, but instead according to distances through the blood vessel system from the reproducibly definable reference point based on a comparison between different patients.

One or more embodiments provide that a number of collaterals out of detectable collaterals for the target region and/or sub-regions of the target region are determined as further collateral information, resulting in a type of overview value indicating the efficiency of the blood supply through the target region or specific sub-regions of the target region. For example, standardized known subdivision into brain regions (e.g., M1, M2, etc.) may be used to achieve an expedient subdivision. The corresponding collateral information may represent rough information (e.g., based on a reference internal to the patient and/or external to the patient, which may be as precise as desired insofar the vascular data set permits this). For example, in order to "count" collaterals, the number of voxels assigned to collaterals may be related to the number of total voxels or the number of voxels not assigned to collaterals and the like. Fifth or sixth reference values internal to the patient or external to the patient may be determined in a similar way (e.g., at least in the case of sixth reference values external to the patient, statistically), and used for the evaluation of the ultimate number of collaterals.

In an embodiment, it is provided that a two-dimensional or three-dimensional (e.g., sub-region-based) collateral map is determined and displayed for the depiction of the locally resolved collateral information. A collateral map of this kind is an excellent way to output collateral information because the collateral map is determined with spatial resolution (e.g., by portions defined along the center line of the collaterals). An overview with part-regions of the target region and/or sub-region have collaterals supplied with blood may be provided, the quality of the blood supply may be identified with locational precision (e.g., the filling parameter and the time parameter may be read as separate information in the collateral map). Alternatively, the image elements in the collateral map may contain as image values a display size derived from the filling parameter and the time parameter. For example, the filling parameter may be weighted with the time parameter, or vice versa. Each image element may contain the filling parameter and the time parameter as display information assigned to different display channels (e.g., in different color channels and/or a brightness channel). The display information provides a two-dimensional depiction of collateral image elements in the collateral map visualizing both the filling parameter and the time parameter. Known visualization options may be used (e.g., different color channels or the use of brightness variations for one of the parameters). A visual locationally accurate reproduction of the collateral information is provided. The visualization is easy to interpret and may be evaluated for further diagnosis/evaluation. If the determination of the collateral information is standardized such that the collateral information may be used reproducibly provided with different patients, comparing different patients and gaining experience in the evaluation of collateral maps of this kind is provided.

A collateral map may be further improved if, during the determination of a sub-region-resolved number of collaterals, the collateral map is used to indicate the background that is not occupied by collaterals (e.g., coloration of the corresponding sub-region is integrated into the collateral map). For example, regions with a smaller number of collaterals may be displayed as reddish, regions of a critical number of collaterals in yellow, and regions of a normal number of collaterals displaying a sufficient blood supply in green. As such, the collateral map may intuitively visualize additional collateral information (e.g., the number of collaterals).

Additionally or alternatively, a collateral map may be determined taking into account at least the time parameter and the filling parameter, and for a collateral score to be determined for sub-regions of the target region and/or determined for the entire target region from which collateral information. Calculation of a blanket evaluation as the final outcome of the evaluation is also contemplated (e.g., resolving a blanket evaluation for sub-regions). For example, when monitoring the brain, a sub-region affected by stroke may be defined, and a collateral score enables a blanket statement to be made (e.g., supplemented by a locationally accurate, locally resolved depiction in a collateral map).

The present embodiments also provide a medical imaging device including a control device configured to carry out the method the method discussed above. The medical imaging device may be an angiography imaging device (e.g., an X-ray device suitable for 4D-DSA). Use of X-ray devices with a C-arm and CT devices is disclosed. The medical imaging device may also be a magnetic resonance device (e.g., where individual imaging devices may also be configured to combine image data from different modalities to form the vascular data set as described above). The disclosure relating to one or more embodiments of the method also apply to the medical imaging device such that the device may also achieve the above-mentioned advantages.

The control device may include a segmentation unit for the segmenting the blood vessel system in the vascular data set, a classification unit implementing the collateral classifier and a collateral-information-determining unit. A visualization unit may be provided for determining a collateral map.

The present embodiments provide a computer program configured to carry out the method acts discussed above when the computer program is executed on a computing device. The computing device may be the aforementioned control device of the medical imaging device. For example, the computer program may be loaded directly into a memory of a control device of a medical imaging device and includes program code configured to carry out the acts of a method the computer program is executed in the control device of the medical imaging device. The computer program may be stored on an electronically readable data medium. An electronically readable data medium may include electronically readable control information stored thereon, including at least one such computer program and is configured to carry out a method when the data medium is used in a control device of an imaging device or another computing device. The data medium may be a non-transient data medium (e.g., a CD-ROM or a DVD. The disclosure relating to one or more embodiments of the method also apply to the computer program and the electronically readable data medium.

BRIEF DESCRIPTION OF THE DRAWINGS

Further advantages and details of the present embodiments may be derived from the exemplary embodiments described below and with reference to the drawings.

DETAILED DESCRIPTION

Figure 1:
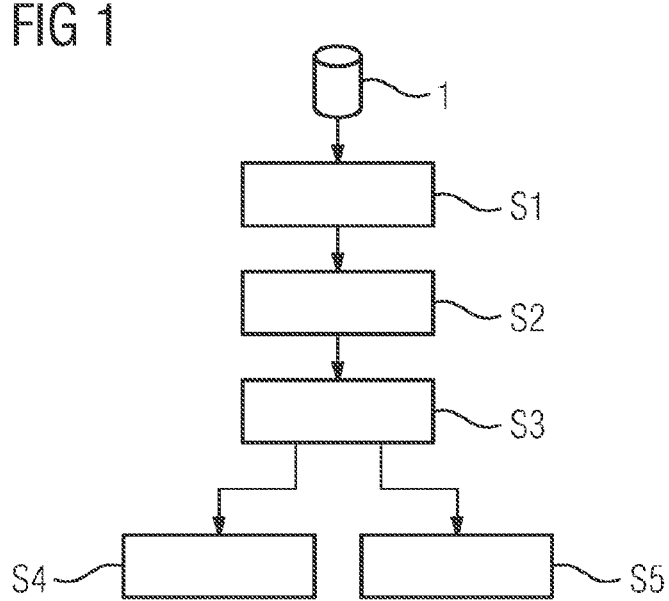
FIG. 1 depicts a flow diagram of an exemplary embodiment of a method for determining collateral information describing the blood flow in collaterals.

FIG. 1 is a flow diagram of an exemplary embodiment of the method. It is assumed that there is a vascular data set showing the blood vessels of a blood vessel system in a target region of a patient. The present exemplary embodiment may use a digital subtraction angiography (4D-DSA) four-dimensional vascular data set of the brain of a patient recorded by X-rays as the imaging modality. For the creating the 4D-DSA-vascular data set 1, a contrast medium is administered to the patient, and at different times during the flow of the contrast medium, both the arterial and the venous phase, three-dimensional filling image data sets of the target region are recorded. A mask data set without contrast medium is subtracted from each of the filling data sets, such that the resulting four-dimensional vascular data set 1 formed by stringing together the individual 3D-DSA subtraction data sets (e.g., in each image value) to encode the temporal course of the concentration of the contrast medium in the corresponding voxel.

Presence of the contrast medium in act Si of the exemplary embodiment provides for carrying out a segmentation of the blood vessels through which the contrast medium has flowed in the target region using known segmentation algorithms. Segmentation may also include the determination of center lines of the blood vessels and diameters of the blood vessels. For example, in act S1, a reference point is localized, and may be obtained reproducibly in different patients within the carotid as a supplying arterial blood vessel.

Figure 2:
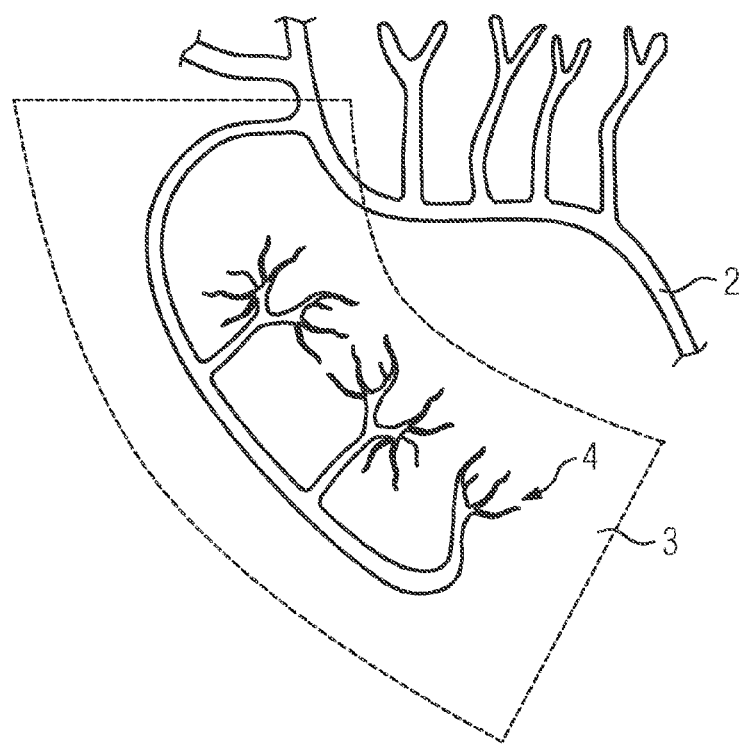
FIG. 2 depicts a schematic of a section of a blood vessel system in a sub-region of the brain.

FIG. 2 is a schematic illustration of a portion of the course of the middle cerebral artery 2 having different branches and only sub-region 3 of the brain as a target region (e.g., cortical region (M3) is depicted). As depicted in FIG. 2, there are blood vessels and side branches branching off toward the parenchyma (not depicted in FIG. 2 and are not resolved in the vascular data set). The parenchyma has a different course in every patient and are described as collaterals 4. The collaterals 4 may be defined as blood vessels with a diameter below a threshold value and/or as a blood vessel branching off from a segment of the artery 2 identified in all humans.

In act S3, referring back to FIG. 1, a collateral classifier is used to identify and select the collaterals 4 in the target region. The collateral classifier may check the diameter of blood vessels to determine whether the diameter is below a threshold value. It is not mandatory to set a delimitation with respect to lower diameters because capillaries in the parenchyma may not be resolved in the X-ray images. Additionally or alternatively, an anatomical atlas may be used within the collateral classifier to identify specific segments of the large arteries present in all humans and to identify blood vessels branching off therefrom as collaterals 4. The collaterals also include anastomoses connecting blood vessels of one type (e.g., arteries or veins).

In act S3, locally resolved collateral information is determined for the identified and selected collaterals 4 for which portions of the respective blood vessels are initially defined. Collateral information is resolved using the aforementioned center lines determined during segmentation in that the portions based on voxels containing the center line are defined. It is contemplated that the evaluation be restricted to such voxels (or sequential voxels along the center line), or that the diameter of the blood vessel perpendicular to the center line is also taken into account wholly or partially. Whenever groups of voxels are considered, the temporal course of the image values may be treated statistically (e.g., averaged).

For each portion containing one or more collateral voxels, a filling parameter and a time parameter may be determined for the known diameter. Characteristics of the temporal course of the image value, and therefore the concentration of the contrast medium, are related to the values classifying the currently monitored portion, serving as a reference.

Figure 3:
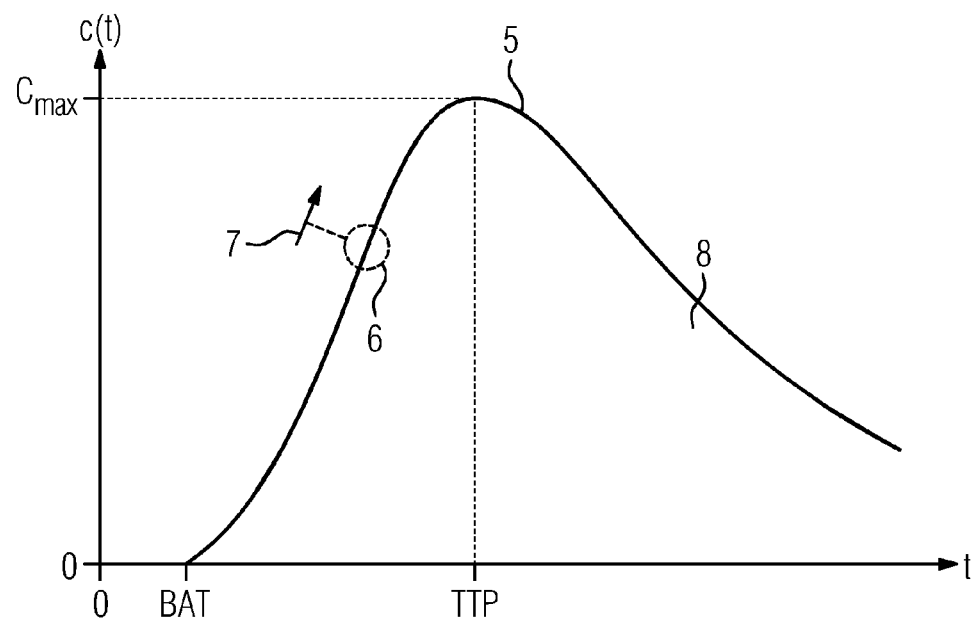
FIG. 3 depicts a temporal course of image values.

FIG. 3 shows an exemplary temporal course 5 of image values for a portion (e.g., the course of the contrast medium concentration c(t) over the time t). The time values discussed below are considered relative to corresponding time values at the above-mentioned reference point in the carotid (e.g., forming delays. Both arterial and venous blood vessels, and delays, are considered.

As depicted, the contrast medium concentration increases during an initial distribution phase starting with the bolus arrival time (BAT) defined as the time at which a limit value for the image value/the contrast medium concentration is exceeded. For simplification, the BAT is depicted at zero at the start of the peak (e.g., because prior to the peak only noise may be contained in the image values). The position 6 of the greatest ascent (e.g., depicted by the arrow 7) is highlighted and may define a time value derivable from the temporal course 5. An important time value characterizing the temporal course 5 is the so-called "time to peak" (TTP) (e.g., the time at which the maximum contrast medium concentration, therefore the maximum image value, is established). In the present embodiment, the TTP is designated $c_{max}$.

In addition to the parameters characterizing the time domains BAT, TTP and the time of maximum ascent, an additional criterion for the evaluation of the blood flow in collaterals 4 is the filling behavior (e.g., how much contrast medium actually arrives in/flows through the monitored portion). For example, one measure for filling behavior is the maximum image value (e.g., the maximum contrast medium concentration $c_{max}$). Additionally or alternatively, the area 8 under the contrast medium curve may be determined (e.g., the temporal course 5) as a filling value. The area under the contrast medium curve is obtained by integration and describes the total amount of the contrast medium flow. The time values and filling values obtained from the evaluation of the temporal course 5 in the monitored portion of a collateral may not be evaluated on their own in a sufficiently informative/intuitive way such that it may only be possible to derive the actual collateral information (e.g., the filling parameter and the time parameter in relation to references).

With respect to the filling value, it may be initially necessary to take into account the diameter of the collateral 4 in the monitored portion because the diameter describes the "capacity." Therefore, only collaterals 4 with the same diameter may be compared with one another. To improve interpretation of the collateral information further with respect to the filling parameter, reference will also be made to a reference value for the filling value describing the behavior of a healthy collateral 4. In this exemplary embodiment, look-up tables sorted by diameters are provided assigning the filling parameter to a filling value for a specific diameter indicating the degree to which the filling value corresponds to that of a healthy collateral 4. The reference values in the look-up table describing the filling value may be determined statistically from a healthy sub-region 3 of the target region (e.g., the brain of the patient) or by statistical treatment of healthy regions of other patients. Preference may be given to a comparison with second reference values external to the patient relating to the same sub-region with healthy circulation.

With respect to time values derived from the temporal course 5 of the image values, specific center lines may be used to determine a distance of the monitored portion to the reference point through the blood vessel system (e.g., a path length through the blood vessel system) because the distances do not mandatorily correlate with the purely geometric distances for lengths outside the blood vessel system. Similar to the diameter, a differentiation is made between different distances or distance intervals. Look-up tables are used to determine the time parameter by comparison with reference values describing time values for healthy collaterals 4 with the same distances from the reference point (e.g., obtained reproducibly independently of the patient).

As further collateral information from act S3 (FIG. 1) based on sub-regions 3 into which the brain is subdivided as the target region, a number of collaterals (therefore a number of collaterals parameter) is determined describing how many blood-supplied collaterals 4 are present in the corresponding sub-region 3. The number of collaterals are defined as a collateral density (e.g., as voxels identified as belonging to a collateral 4 to the total voxels of the sub-region 3) or in another way.

The collateral information resolved for the collaterals 4 and the different portions thereof may be further processed in a different way. For example, in act S4, a collateral map is determined three-dimensionally or two-dimensionally (e.g., by corresponding projection or rendering methods). An image value is obtained from the filling parameter and the time parameter is assigned to each image element (e.g., a voxel or pixel) of the collateral map. For example, reproduction of independent display channels uses different color channels, or a color channel for one of the parameters and a brightness channel for the other parameter, such that the two parameters are identifiable in the visual depiction of the collateral map. The number of collaterals is also processed such that image elements that are not occupied by collaterals 4 (e.g., the background) is colored. For example, the background may be colored in red with a low number of collaterals, in yellow with a critical number of collaterals and in green with a normal number of collaterals (e.g., relation to references external to the patient or internal to the patient is advisable).

The collateral map may be output to a user via a corresponding display device, allowing the user to interpret the map (e.g., issue diagnoses, assess the outcome of the therapy, and/or plan therapeutic measures).

At act S5, a collateral score is determined with sub-region resolution taking into account at least the filling parameter and the time parameter. The number of collaterals may also be taken into account. Therefore, the collateral score contains easily-understood general information for a sub-region. The collateral score may be output in an appropriate way (e.g., together with the collateral map).

Figure 4:
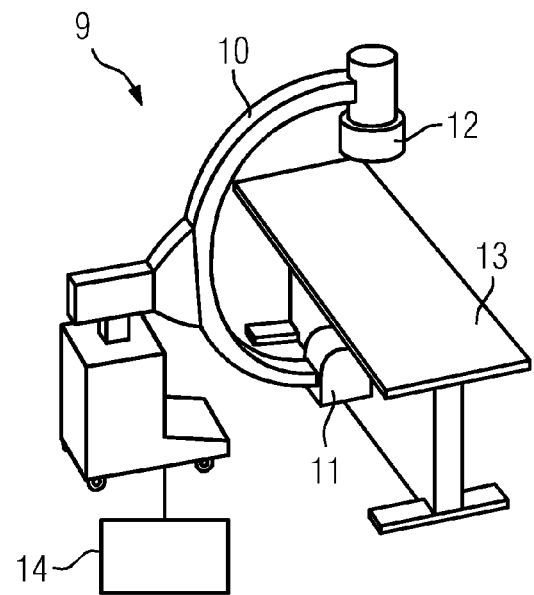
FIG. 4 depicts an exemplary embodiment of a medical imaging device for determining collateral information describing the blood flow in collaterals.

FIG. 4 shows a medical imaging device 9 provided as an angiography X-ray device with a C-arm 10. An X-ray source 11 and an X-ray detector 12 are arranged opposite one another thereupon. The C-arm 10 may be swiveled about a patient bed 13 on which a patient may be placed for the recording of projection images based on a three-dimensional image data set. The medical imaging device 9 may be provided as a CT device or a magnetic resonance device.

Operation of the medical imaging device 9 may be controlled by a control device 14 configured to carry out a disclosed method. The control device 14 may include a segmentation unit for carrying out the act S1, a classification unit for carrying out the act S2 and a collateral-information-determining unit for carrying out the act S3. A visualization unit may be provided for determining a collateral map (e.g., act S4).

A method as described herein may be provided as a computer program that implements the method on the control device 14 when the program is executed on the control device 14. An electronically readable data medium (not shown) on which electronically readable control information is stored may be provided including at least one computer program as described and configured such that the electronically readable control information carries out a method as described when the data medium is used in the control device 14.

Although the invention was illustrated and described in more detail by the present exemplary embodiments, the invention is not restricted by the disclosed examples and other variations may be derived therefrom by the person skilled in the art without departing from the scope of protection of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for determining collateral information describing blood flow in collaterals of a blood vessel system in a target region of a patient from a four-dimensional vascular data set recorded by a medical imaging device describing, in the four-dimensional vascular data values, temporal flow of a contrast medium, marked blood constituents, or the temporal flow of the contrast medium and the marked blood constituents through the target region, the method comprising:
   segmenting the blood vessel system in the four-dimensional vascular data set;
   determining collaterals among the segmented blood vessels by a collateral classifier;
   determining, for all determined collaterals, a diameter of the collaterals taking into account the segmentation, a filling parameter describing a filling of the collaterals, and a time parameter describing a time response relative to a reference point in the blood vessel system from a temporal course of image values in a monitored portion of the collaterals; and
   determining the collateral information for, or as a function of, the filling parameter and the time parameter.

2. The method of claim 1, wherein a four-dimensional subtraction angiography data set, a magnetic resonance data set, or the four-dimensional subtraction angiography data set and the magnetic resonance data set is used as a vascular data set, and/or
   wherein the target region is the head.

3. The method of claim 1, wherein a segmented vessel is classified as a collateral when the segmented vessel diameter is smaller than a threshold value or the segmented vessel lies within a collateral interval, and/or
   wherein vessels branching off toward a parenchyma from main vessels identified by an anatomical atlas are classified as collaterals.

4. The method of claim 1, wherein center lines of the vessels of the blood vessel system are determined and used to define the monitored portion.

5. The method of claim 4, wherein the collateral information for voxels lying on the center lines, voxel groups comprising an extension of a collateral perpendicular to the center line, and/or vascular sections defined along the center line are determined as the monitored portion.

6. The method of claim 1, wherein the filling parameter is determined as a function of a maximum in the temporal course, a flow rate determined by integration of the flow rate over the temporal course, and/or an increase in the temporal course in an initial distribution phase.

7. The method of claim 1, wherein the filling parameter is determined based on the diameter, at least one first reference value for a same patient, and/or at least one external second reference value.

8. The method of claim 7, wherein the first reference value and/or a second reference value are determined statistically according to diameters of the collaterals, diameters for the target region, and/or diameters of a sub-region of the target region.

9. The method of claim 1, wherein the time parameter is determined as a function of a bolus arrival time, a time until a maximum image value, or the bolus arrival time and the time until the maximum image value.

10. The method of claim 1, wherein a predetermined reference point is localized in the vascular data set taking into account the segmentation,
wherein a time is used as the time parameter, wherein the time is used for the determination of the time parameter relative to a reference time determined at the reference point, or wherein the time is used as the time parameter and for the determination of the time parameter relative to a reference time determined at the reference point.

11. The method of claim 10, wherein a reference point in a supply vessel of the blood vessel system of the target region is used.

12. The method of claim 10, wherein center lines through the segmented blood vessels are used as a basis for the determining a spatial distance through the blood vessel system between the reference point and the monitored portion, wherein the time parameter is determined based on the spatial distance.

13. The method of claim 1, the time parameter is determined based on a third reference value for a same patient, an external fourth reference value, or the third reference value for the same patient and the external fourth reference value.

14. The method of claim 13, wherein the third reference value, the fourth reference value, or the third reference value and the fourth reference value are determined statistically broken down according to distances from the reference point.

15. The method of claim 1, wherein a number of collaterals of detectable collaterals for the target region, sub-regions of the target region, or the target region and the sub-regions of the target region are determined as further collateral information.

16. The method of claim 1, wherein a two-dimensional or three-dimensional sub-region-based collateral map is determined and displayed for the depiction of locally resolved collateral information.

17. The method of claim 16, wherein image elements of the collateral map contain, as an image value, a display size derived from the filling parameter and the time parameter, or the filling parameter and the time parameter are contained in each image element as display information assigned to different display channels in different color channels, a brightness channel, or in different color channels and the brightness channel.

18. The method of claim 16, wherein, during the determination of a sub-region-resolved number of collaterals, the number of collaterals is integrated into the collateral map as a colored indicator of a background not occupied by collaterals of the corresponding sub-region.

19. The method of claim 1, wherein, taking into account at least the time parameter and the filling parameter, a collateral score is determined for sub-regions of the target region, the target region, or sub-regions of the target region and the target region.

20. A medical imaging device comprising:
a control device configured to:
segment the blood vessel system in a vascular data set;
determine collaterals among segmented blood vessels by a collateral classifier;
determine, for all determined collaterals, a diameter of the collaterals taking into account the segmentation, a filling parameter describing a filling of the collaterals, and a time parameter describing a time response relative to a reference point in the blood vessel system from a temporal course of image values in a monitored portion of the collaterals; and
determine the collateral information for, or as a function of, the filling parameter and the time parameter.

21. A computer program product comprising program code stored on a non-transitory computer-readable storage medium, the program code, when executed on a computer, is configured to:
segment the blood vessel system in a vascular data set;
determine collaterals among segmented blood vessels by a collateral classifier;
determine, for all determined collaterals, a diameter of the collaterals taking into account the segmentation, a filling parameter describing a filling of the collaterals, and a time parameter describing a time response relative to a reference point in the blood vessel system from a temporal course of image values in a monitored portion of the collaterals; and
determine the collateral information for, or as a function of, the filling parameter and the time parameter.

* * * * *